United States Patent
Luo et al.

(10) Patent No.: US 10,769,009 B2
(45) Date of Patent: Sep. 8, 2020

(54) ROOT CAUSE ANALYSIS FOR CORRELATED DEVELOPMENT AND OPERATIONS DATA

(71) Applicant: INTERNATIONAL BUSINESS MACHINES CORPORATION, Armonk, NY (US)

(72) Inventors: Yan Luo, Toronto (CA); Peter Haumer, San Jose, CA (US); Gary Mazo, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 15/927,363

(22) Filed: Mar. 21, 2018

(65) Prior Publication Data

US 2019/0294484 A1 Sep. 26, 2019

(51) Int. Cl.
| | | |
|---|---|---|
| *G06F 11/00* | (2006.01) | |
| *G06F 11/07* | (2006.01) | |
| *G06F 11/36* | (2006.01) | |
| *G06N 5/02* | (2006.01) | |
| *G06N 20/00* | (2019.01) | |

(52) U.S. Cl.
CPC ........ *G06F 11/079* (2013.01); *G06F 11/0793* (2013.01); *G06F 11/3676* (2013.01); *G06N 5/02* (2013.01); *G06N 20/00* (2019.01)

(58) Field of Classification Search
CPC ............. G06F 11/0706; G06F 11/0778; G06F 11/079; G06F 11/0793; G06F 11/366; G06F 11/3495; G06F 8/71; G06F 2201/865
See application file for complete search history.

(56) References Cited

U.S. PATENT DOCUMENTS

| | | | | |
|---|---|---|---|---|
| 5,655,081 A * | 8/1997 | Bonnell | ............. | G06F 11/0748 709/202 |
| 6,282,701 B1* | 8/2001 | Wygodny | ........... | G06F 11/3466 702/183 |
| 6,499,114 B1* | 12/2002 | Almstead | ........... | G05B 19/4184 714/25 |
| 7,383,191 B1* | 6/2008 | Herring | ............. | G06Q 30/0283 379/111 |
| 7,603,222 B2* | 10/2009 | Wiseman | ................ | F01D 17/24 701/100 |
| 7,721,152 B1* | 5/2010 | Joshi | ................... | G06F 11/0709 714/15 |
| 8,989,954 B1* | 3/2015 | Addepalli | ......... | H04W 72/0406 701/32.3 |
| 9,336,484 B1* | 5/2016 | Iverson | ............... | G06F 16/2462 |

(Continued)

Primary Examiner — Bryce P Bonzo
Assistant Examiner — Jeison C Arcos
(74) Attorney, Agent, or Firm — Cantor Colburn LLP; Teddi Maranzano

(57) ABSTRACT

Embodiments of the invention include methods, systems, and computer program products for root cause analysis. Aspects of the invention include receiving, by a processor, operations data associated with a plurality of applications. A trend analysis is performed on the operations data to determine an operations issue associated with at least one of the plurality of applications. And a root-cause analysis is performed on the operations issue to identify a set of candidate applications from the plurality of applications that may be a cause of the operations issue.

18 Claims, 7 Drawing Sheets

(56) References Cited

U.S. PATENT DOCUMENTS

| | | | |
|---|---|---|---|
| 9,661,018 B1* | 5/2017 | Aziz | H04L 63/1425 |
| 9,929,926 B1* | 3/2018 | Streete | H04L 43/0876 |
| 2002/0184065 A1* | 12/2002 | Menard | G06Q 30/06 709/224 |
| 2002/0194304 A1* | 12/2002 | Cramer | H04L 29/06 709/218 |
| 2003/0065986 A1* | 4/2003 | Fraenkel | G06F 11/3006 714/47.2 |
| 2003/0079160 A1* | 4/2003 | McGee | G06F 11/0709 714/39 |
| 2003/0110007 A1* | 6/2003 | McGee | G06F 11/0709 702/179 |
| 2003/0204350 A1* | 10/2003 | Rearick | G01R 31/31832 702/117 |
| 2003/0204683 A1* | 10/2003 | Okumoto | G06F 3/061 711/147 |
| 2004/0068560 A1* | 4/2004 | Oulu | G06F 11/3495 709/224 |
| 2004/0199573 A1* | 10/2004 | Schwartz | G05B 23/0229 709/201 |
| 2004/0225381 A1* | 11/2004 | Ritz | G06F 11/0709 700/26 |
| 2004/0236820 A1* | 11/2004 | Flocken | G06F 11/0709 709/200 |
| 2005/0015217 A1* | 1/2005 | Weidl | G05B 17/02 702/185 |
| 2007/0066297 A1* | 3/2007 | Heidari-Bateni | H04L 43/00 455/423 |
| 2007/0192078 A1* | 8/2007 | Nasle | G05B 23/0254 703/14 |
| 2007/0213956 A1* | 9/2007 | Nasle | G06F 17/5009 702/182 |
| 2007/0219732 A1* | 9/2007 | Creus | H04M 1/24 702/61 |
| 2007/0283335 A1* | 12/2007 | D'Amore | G06F 8/71 717/141 |
| 2008/0040174 A1* | 2/2008 | Murthy | G06Q 30/06 709/224 |
| 2008/0154889 A1* | 6/2008 | Pfeiffer | G06F 16/738 |
| 2009/0012826 A1* | 1/2009 | Eilam | G06Q 30/02 705/7.31 |
| 2010/0058349 A1* | 3/2010 | Diwakar | G06F 9/5044 718/104 |
| 2010/0100337 A1* | 4/2010 | Vichare | G06F 11/008 702/34 |
| 2011/0119219 A1* | 5/2011 | Naifeh | H04L 41/0604 706/47 |
| 2012/0166623 A1* | 6/2012 | Suit | G06F 11/3006 709/224 |
| 2012/0167094 A1* | 6/2012 | Suit | G06F 9/5077 718/100 |
| 2012/0197852 A1* | 8/2012 | Dutta | H04L 67/2804 707/692 |
| 2012/0311260 A1* | 12/2012 | Yamagiwa | H04L 41/085 711/117 |
| 2013/0212440 A1* | 8/2013 | Rom | G06F 11/0709 714/47.1 |
| 2013/0227714 A1* | 8/2013 | Gula | H04L 63/0876 726/32 |
| 2013/0281795 A1* | 10/2013 | Varadan | A61B 5/02055 600/301 |
| 2013/0297560 A1* | 11/2013 | Becker | G06F 16/23 707/609 |
| 2014/0025417 A1* | 1/2014 | Appel | G06Q 10/063114 705/7.15 |
| 2014/0257828 A1* | 9/2014 | Thornley | G06F 11/00 705/2 |
| 2014/0261189 A1* | 9/2014 | Chait | A01K 45/00 119/6.8 |
| 2014/0266790 A1* | 9/2014 | Al-Ali | G08C 17/02 340/870.09 |
| 2015/0026413 A1* | 1/2015 | Meier | G06F 12/0862 711/137 |
| 2015/0133076 A1* | 5/2015 | Brough | G06F 11/302 455/405 |
| 2015/0163121 A1* | 6/2015 | Mahaffey | G06F 11/0709 707/687 |
| 2015/0192439 A1* | 7/2015 | Mihelich | G01D 18/00 702/104 |
| 2015/0222516 A1* | 8/2015 | Deval | H04L 67/1029 370/253 |
| 2015/0381646 A1* | 12/2015 | Lin | H04L 63/1416 726/23 |
| 2016/0008079 A1* | 1/2016 | Carlson | A61B 1/123 702/182 |
| 2016/0103838 A1* | 4/2016 | Sainani | G06F 3/0488 707/725 |
| 2016/0107086 A1* | 4/2016 | Baszucki | A63F 13/79 463/42 |
| 2016/0203036 A1* | 7/2016 | Mezic | G06F 11/079 714/819 |
| 2016/0320768 A1* | 11/2016 | Zhao | G05B 19/406 |
| 2016/0350103 A1 | 12/2016 | Doganata et al. | |
| 2016/0357660 A1 | 12/2016 | Dean et al. | |
| 2016/0379486 A1* | 12/2016 | Taylor | G08G 1/096844 340/905 |
| 2017/0003984 A1* | 1/2017 | Gatson | G06F 9/44505 |
| 2017/0004421 A1* | 1/2017 | Gatson | G06Q 10/06 |
| 2017/0046217 A1* | 2/2017 | Shinde | G06F 11/0715 |
| 2017/0075744 A1 | 3/2017 | Deshpande et al. | |
| 2017/0153936 A1* | 6/2017 | Vorganti | G06F 11/079 |
| 2017/0222908 A1* | 8/2017 | Sevagapandian | H04L 43/0888 |
| 2017/0235622 A1* | 8/2017 | Boyapalle | G06F 11/3055 714/47.2 |
| 2017/0315917 A1* | 11/2017 | Yamamoto | G06F 12/0862 |
| 2017/0357525 A1* | 12/2017 | Gatson | G06F 9/44505 |
| 2019/0068627 A1* | 2/2019 | Thampy | H04L 63/20 |

\* cited by examiner

ROOT CAUSE ANALYSIS FOR CORRELATED DEVELOPMENT AND OPERATIONS DATA

BACKGROUND

The present invention generally relates to development and operations data, and more specifically, to root cause analysis for correlated development and operations data.

Customers, typically, want to identify the root-cause and risk factors associated with performance issues. However, some transactions are too complex to review. With thousands of artifacts and very complex call graphs, review can be time-consuming and labor-intensive, especially when analyzing graphs and metrics manually. Also, there are no correlations of different levels of data to help a customer find and understand a root-cause. While transaction composition and static analysis data are available, the amount of data can be very large and present difficulties when users drill down to whole application and application parts levels to try and find the problem themselves.

SUMMARY

Embodiments of the present invention are directed to a computer-implemented method for root cause analysis. A non-limiting example of the computer-implemented method includes receiving, by a processor, operations data associated with a plurality of applications. A trend analysis is performed on the operations data to determine an operations issue associated with at least one of the plurality of applications. And a root-cause analysis is performed on the operations issue to identify a set of candidate applications from the plurality of applications that may be a cause of the operations issue.

Embodiments of the present invention are directed to a system for root cause analysis. A non-limiting example of the system includes receiving, by a processor, operations data associated with a plurality of applications. A trend analysis is performed on the operations data to determine an operations issue associated with at least one of the plurality of applications. And a root-cause analysis is performed on the operations issue to identify a set of candidate applications from the plurality of applications that may be a cause of the operations issue.

Embodiments of the invention are directed to a computer program product for root cause analysis, the computer program product comprising a computer readable storage medium having program instructions embodied therewith. The program instructions are executable by a processor to cause the processor to perform a method. A non-limiting example of the method includes receiving, by a processor, operations data associated with a plurality of applications. A trend analysis is performed on the operations data to determine an operations issue associated with at least one of the plurality of applications. And a root-cause analysis is performed on the operations issue to identify a set of candidate applications from the plurality of applications that may be a cause of the operations issue.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
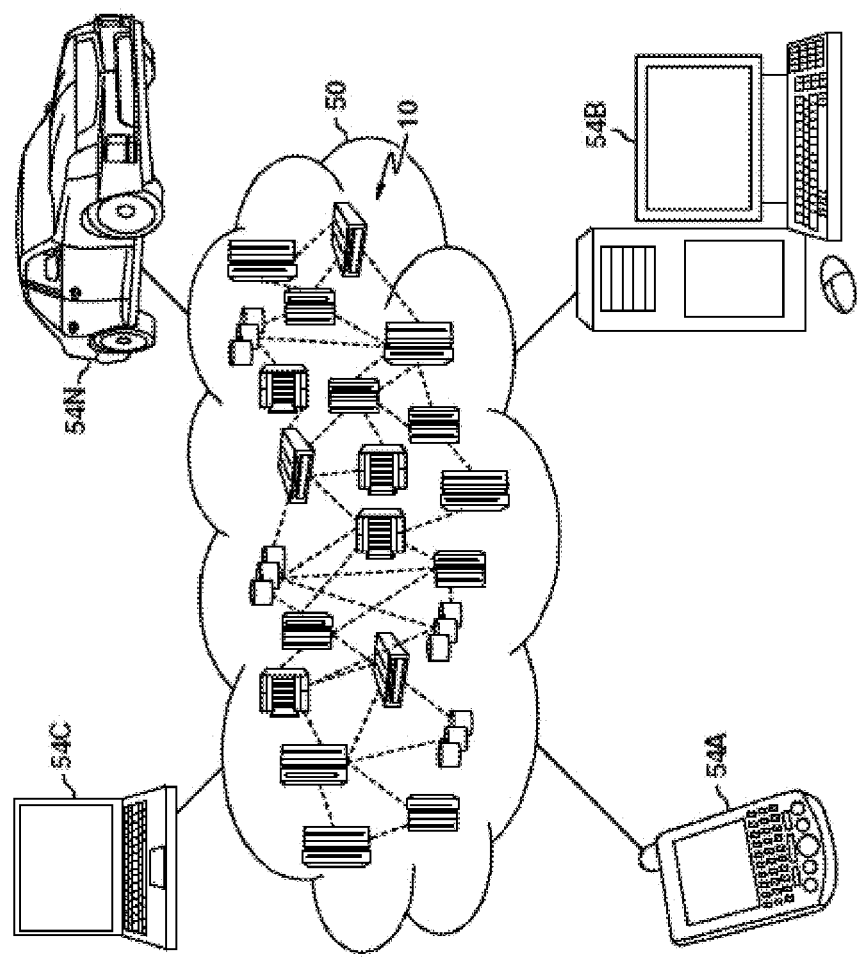
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
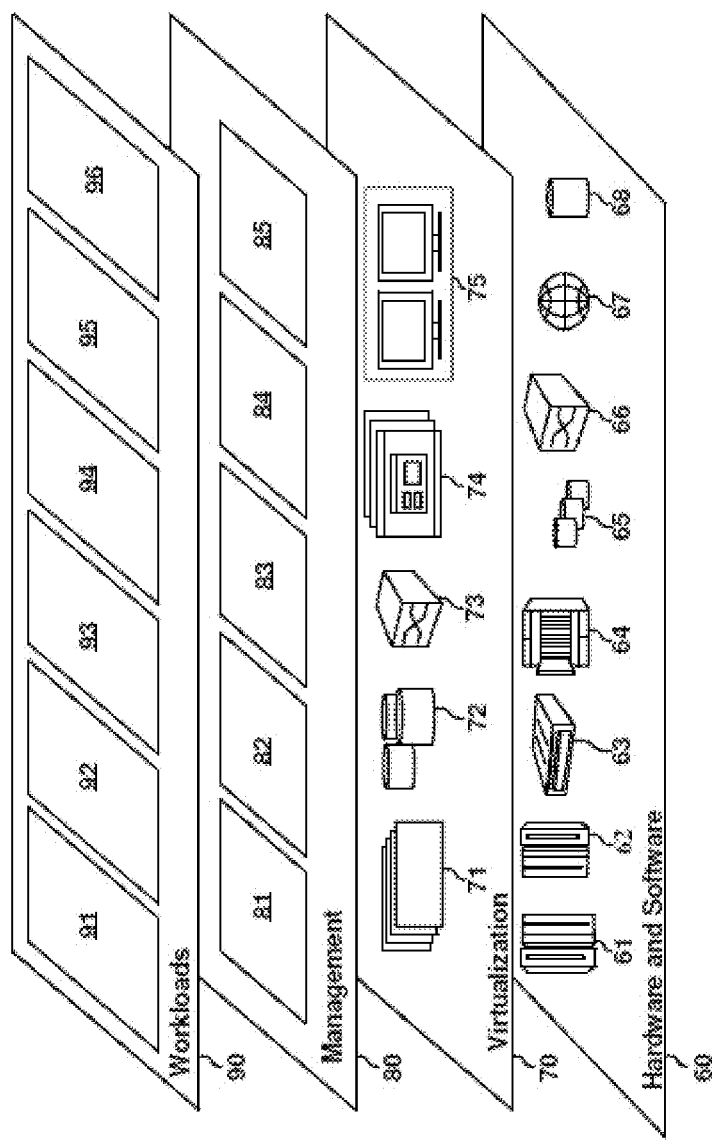
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performing root cause analysis 96.

Figure 3:
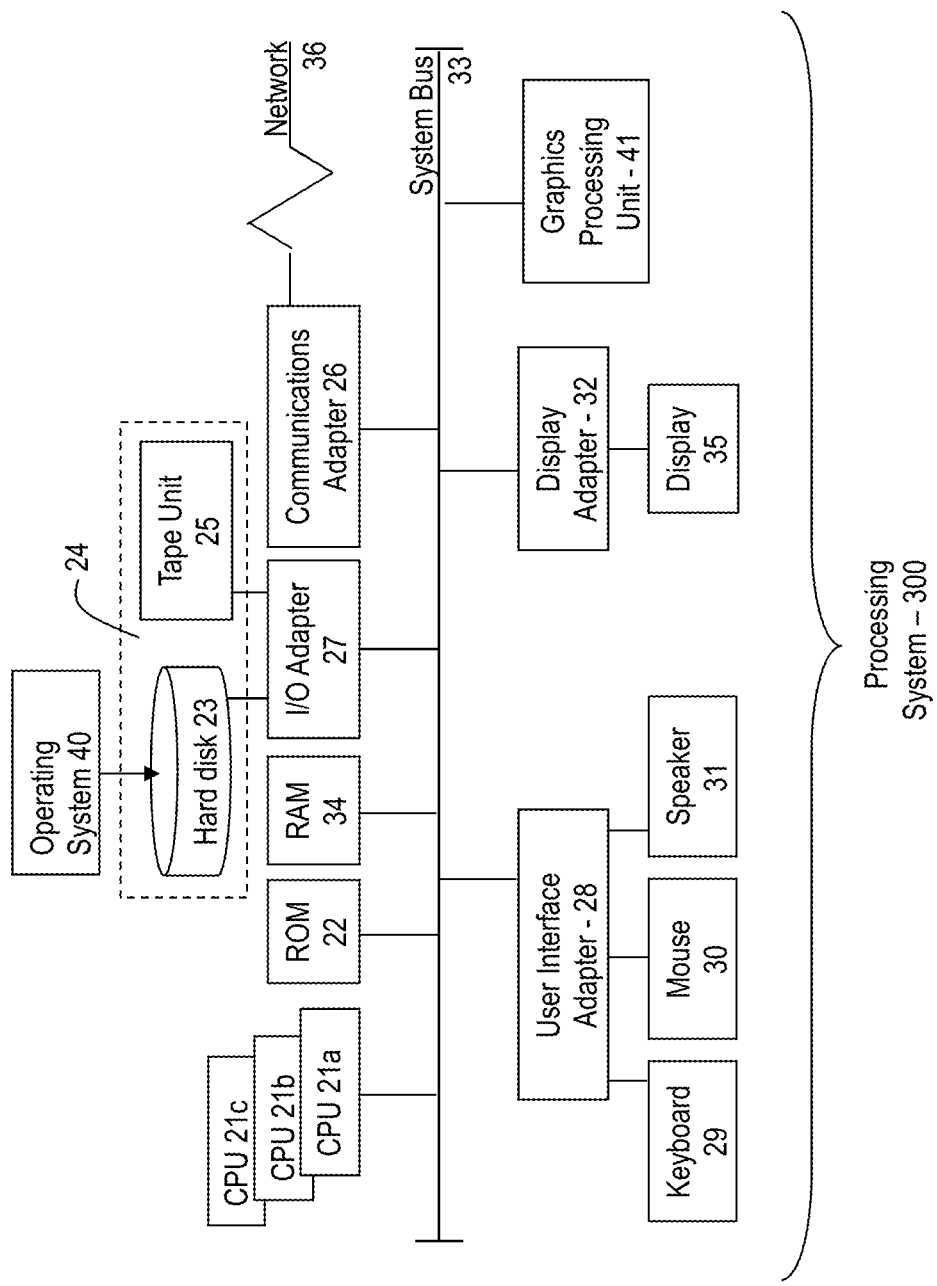
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, throughout the development and operations (DevOps) lifecycle, a large amount of data is produced, including code, requirements, designs, test artifacts, program artifacts, and operational information about applications. Customers want to be proactively notified or alerted as early as possible on operational (Ops) issues (such as large application response time or CPU time) and be able to efficiently identify the root-cause and risk factors of those issues, and act accordingly. Several challenges exist related to root-cause and risk factor analysis. One challenge is that Ops data with large volume, high variety, and high velocity is a real-world big data problem. For example, one medium sized banking institution can have millions of transactions per hour. Each transaction could have dozens of operational metrics to monitor such as CPU time or response time. Effective methods and systems are needed to proactively analyze risky patterns in such time-series Ops data, or even predict the Ops hazards such as server crashes. Another challenge is that the compositions of enterprise applications and transactions are normally very complex, e.g., involve tens of thousands of program artifacts and complex call relationships and structures. Even when the transaction composition and program static analysis data are available, the amount of data could be huge and presents difficulties when users drill down to whole application and application parts level and try to find the problem themselves. Thus, it could be very time-consuming and labor-intensive for customers to analyze the graph and metrics manually. In addition, there are no correlations of DevOps data to help them find and understand the root-cause and risk factors. Lastly, once root-cause and risk factors are identified with confidence, how can actionable recommendations be generated to alleviate or resolve the Ops issues.

Turning now to an overview of the aspects of the invention, one or more embodiments of the invention address the above-described shortcomings of the prior art by providing visual analytics technologies and machine learning based methods and systems to perform root cause and risk factors in correlated development (Dev) and operations (Ops) data.

Figure 4:
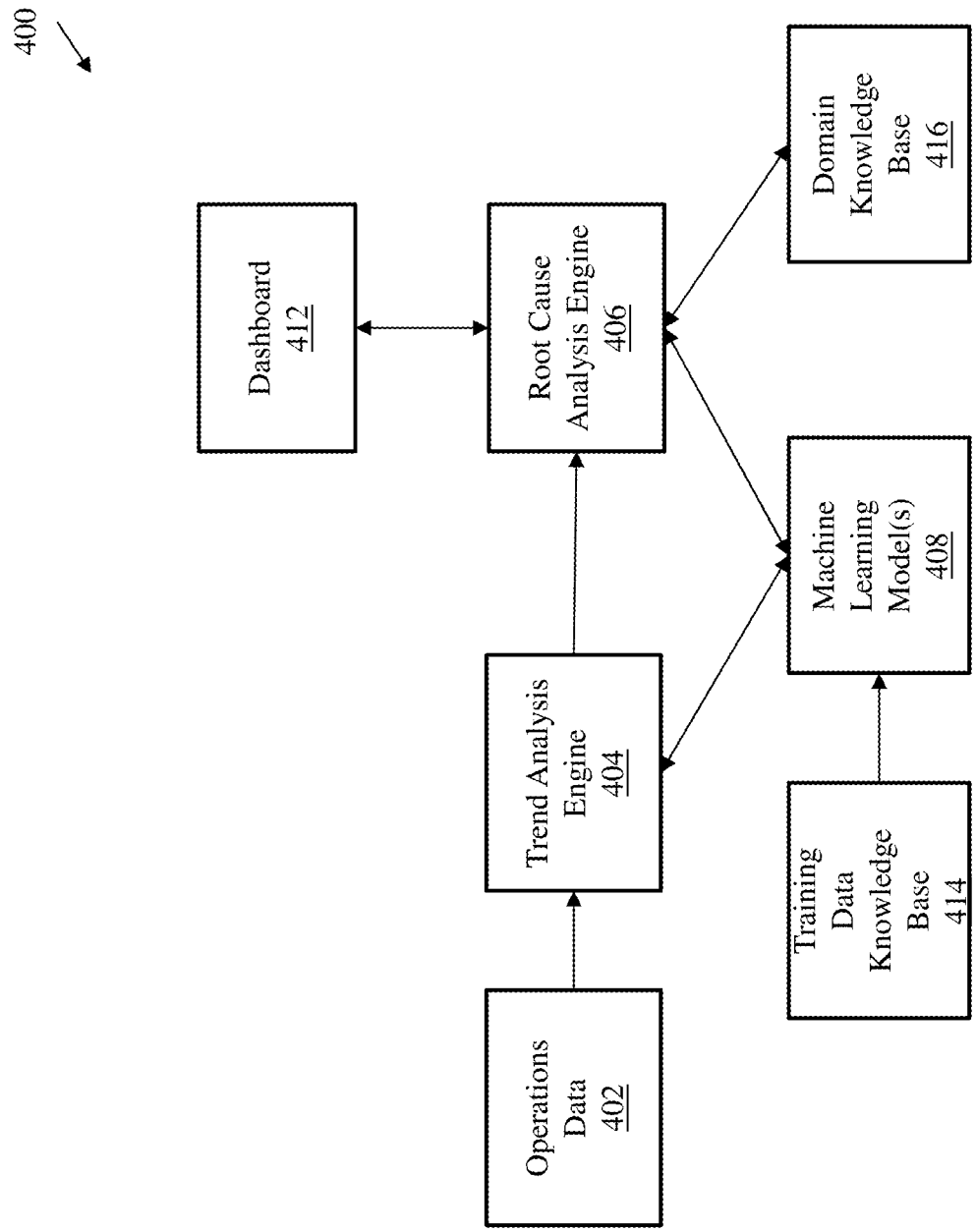
FIG. 4 depicts a block diagram of a system for root cause analysis according to one or more embodiments of the invention.

FIG. 4 depicts a block diagram of a system for root cause analysis according to one or more embodiments of the invention. The system 400 includes operations data 402, a trend analysis engine 404, a root cause analysis engine 406, machine learning models 408, an interactive dashboard 412, a training data knowledge base 414, and a domain knowledge base 416.

In one or more embodiments of the invention, the trend analysis engine 404 and the root cause analysis engine can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In one or more embodiments of the present invention, the system 400 identifies operations issues taken from operations data 402. As described herein, the trend analysis engine 404 analyzes operations data 402 to identify an operations issue based on identifying certain trends or patterns that can indicate an operations issue. The operations data 402 includes large volume, high variety, and high velocity data about a host of applications and modules running in a software system. For example, a user purchasing a product online may be dealing with a long wait time for his or her transaction to process. For the purchase of the product, many software applications need to work together to complete the purchase online. Multiple long wait times constitutes a trend in the operation data 402 that needs to be identified to show that the many software applications have a potential operations issue. Once the operations issue is identified by the trend analysis engine 404, a root cause analysis is performed by the root cause analysis engine 406. A root cause could be something going wrong in a software program, excessive wait time on a database operation, a logical error, and the like. Certain features (e.g., risk factors candidates) for a program that might be a root cause include program complexity, maintainability index, number of lines of code, calls to a database, any recent changes to a program, code coverage, and the like. For both the trend analysis engine 404 and the root cause analysis engine 406, a set of machine learning models 408 can be employed. The machine learning models 408 can utilize training data from a training data knowledge base 414 to train the parameters in the models. The training data can be either labelled or unlabeled training data. Labelled training data can include historical root cause analysis data taken from historical root causes associated with applications or other operations data. The system 400 can create actionable recommendations for the dashboard 412 based on the root cause analysis and domain knowledge taken from the domain knowledge database 416.

In one or more embodiments, the system 400 highlights transaction-level operations (Ops) issues identified from operations data 402 using an interactive dashboard 412 to enable manual trend analysis and thresholds comparisons. Ops issues (such as CPU response time peaks in line charts) can be revealed visually via visualization technologies and user explorations. Utilize visualization technologies and machine learning models 408, such as time-series analysis, to find risky patterns in trends. Risky Ops patterns can be found utilizing supervised or unsupervised machine learning algorithms or models 408. An example algorithm can include peak or spike detection algorithms facilitated in the trend analysis engine 404. Peaks or spikes in a trend are strong indications of abnormal behaviors of a transaction. Peak detection algorithms can proactively detect peaks and spikes in a trend, such as high CPU time or response time, and notify or alert users (system administrators) with detected peaks or spikes through the interactive dashboard 412 or any other means. Another type of machine learning algorithms includes peak or spike prediction algorithms. Machine learning predictive analysis models 408 can be utilized to predict peaks or spikes which are likely to happen in the near future and notify or alert users with upcoming peaks or spikes. Methods such as auto-regressions can be used to perform peak or spike prediction tasks. Peak and spike prediction is a supervised learning task. Auto-regression, neural networks, or even deep learning can be trained to predict the future operational metrics (such as CPU wait time in the next 30 minutes), based on the historical operational metrics or lags (e.g., features). A lag represents a time interval, such as 5 or 10 minutes. The peak or spike prediction are linear or non-linear combinations of operational data in historical lags. Another type of Ops issue detection algorithm includes trend outlier detection. Trend outlier detection finds outlier or anomaly of trends. For example, the response time trend of a transaction on a Tuesday has a different pattern than other days in the week. Methods such as clustering or classification algorithms could be used to find trend outliers or anomalies. Moreover, trend classification based health check can also be utilized to classify whether a trend segment is healthy or unhealthy, under a certain context. Trend classification aims to perform a health check on trends. Trend classification is also a supervised learning task. Support Vector Machine (SVM), Random Forests, Logistic Regression or Deep Learning can be trained to classify a trend to be "healthy" or "unhealthy". Should shallow models, such as SVM or logistic regression, be used, time series feature vectors need to be defined and extracted in OPS data such as mean, standard deviation, skewness, kurtosis, energy preserving features from discrete Fourier transforms (DFT), and the like. Should deep learning be utilized, time series feature extraction might not be needed.

Figure 5:
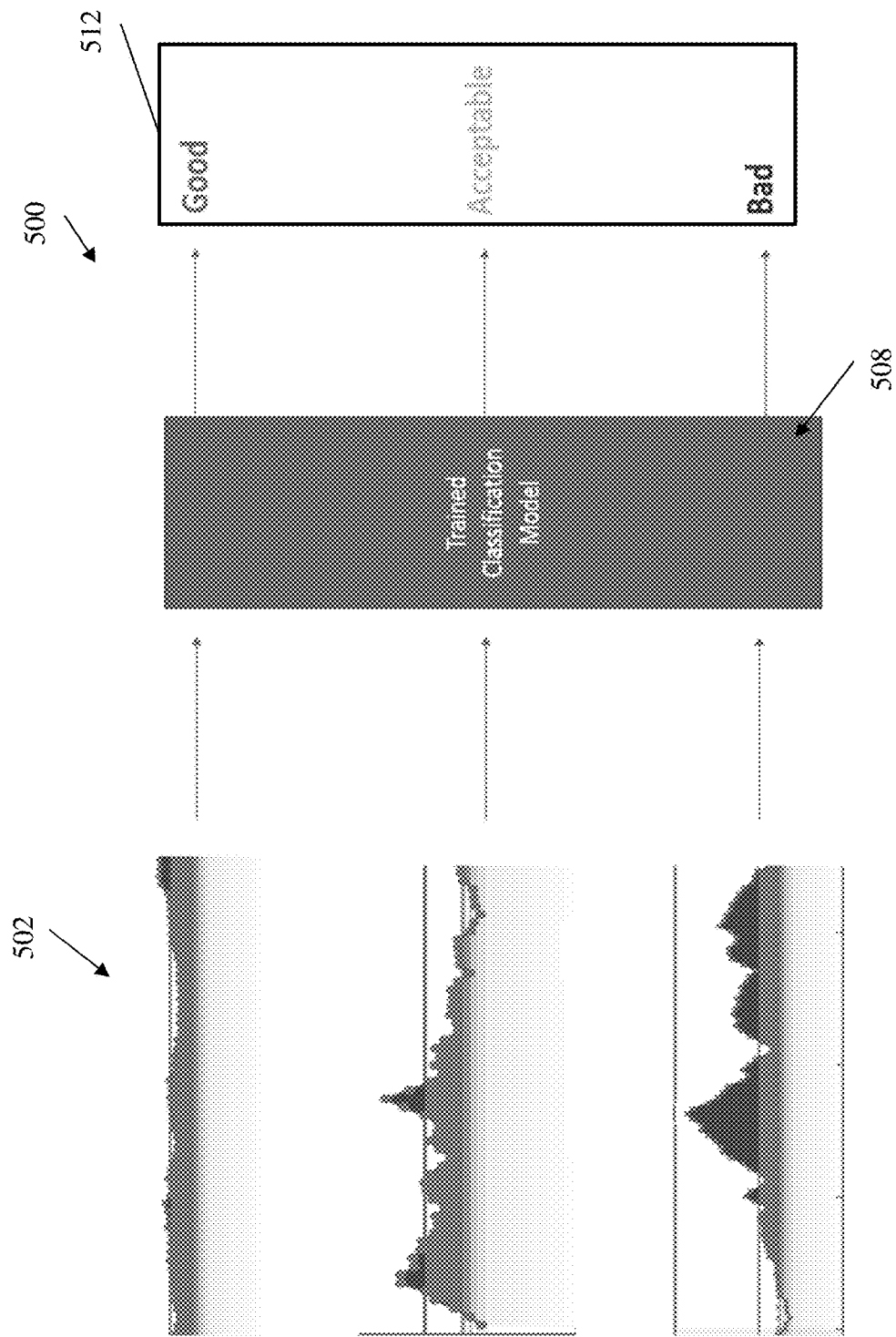
FIG. 5 depicts a block diagram of a trend classification model according to one or more embodiments of the invention.

FIG. 5 depicts a block diagram of a trend classification model according to one or more embodiments of the invention. The classification model 508 can be implemented on the system 400 depicted in FIG. 4. In the illustrated example, there are three trend graphs 502 inputted in to the trained classification model 508 which analyzes the trend graphs and classifies the trends into predefined categories 512, for example: 1) Good, 2) Acceptable, or 3) Bad. Once bad trends are discovered, customer alerts can be generated and sent to the customer or displayed on the dashboard 412. The predefined categories 512 can assist with defining Ops issues types. In one or more embodiments of the invention, each Ops issue can be defined asp, which belongs to a set of predefined Ops issue set P. Ops issue types include but are not limited to peak, outlier, or trend as described above. Problematic patterns in Ops trends can be different, i.e., different issues in different applications Ops trends could be different. For example, a busy and fully-loaded CPU trend during Boxing Day can be considered as normal but such trends are not normal in a regular holiday. Thus, trend classification is context-dependent, and different models and training data need to be tailored under specific contexts.

In one or more embodiments of the invention, a root cause and risk factor analysis can be performed. A program artifact can be represented using the following four types of attributes or features: S: Static analysis metrics about a program such as the number of lines of source code, program complexity index, program maintainability index, etc. M: Recently modified. Whether this program has added lines, deleted lines, modified lines, or any other kinds of revisions. A recently changed and poorly-tested program could cause functionality or performance regressions. R: Call reference information. The call reference means the list of other artifacts calling it and the list of other artifacts it calls out. For example, one program calls out databases and is also being called by other artifacts. C: Code coverage. A measure of how much of code in a program or file is being executed as part of a test or test case. The result can contain coverage for one or more programs or files, depending on how the test is structured Thus, a program artifact can be represented by using a feature vector F: F=(S, R, C). This feature vector F can be further expanded with more features or attributes to represent a program with more details, to discriminative a program more comprehensively. For the outcome of root cause analysis, a correlation, coefficient, or weight is found for each feature with respect to an Ops issue p, and the probability or likelihood of a program to be root-cause will be generated based on the summary of coefficients of all features In one or more embodiments of the invention, correlations can be determined heuristically using domain knowledge or empirically with data and machine learning models. Performing a root-cause analysis can include transaction composition graph and transaction composition table, a visual analytics tool intelligently displays the call graph of programs on the dashboard 412 for a user. For this root-cause analysis, users can manually perform risk analysis on the graph to explore the potential root-cause and risk factors.

In another embodiment, the root-cause analysis can be a machine learning based program level root-cause analysis utilizing a set of machine learning models 408. This type of cognitive approach aims to automatically find the root-causes of an Ops issue, which contains two types of methods, e.g., supervised learning methods and unsupervised learning methods.

In one or more embodiments, if labeled root-cause training data under specific contexts are available, supervised machine learning methods can be used to find the root-cause and risk factors of Ops issues. Each training data entry can be described as one (P, F) pair. This pair includes historical records of root-causes of Ops issues. For example, high database wait time can be caused by poor-written database query statements, etc. Supervised learning methods calculate the coefficient or weight of each feature in feature vector F as risk factor candidate and the likelihood of being the root-cause of an Ops issue. A program artifact with the largest likelihood will be returned as root-cause and the features with large coefficients or weights will be returned as risk factors.

Supervised classification models (such as Logistic Regression, Support Vector Machine (SVM), RandomForest, and Deep learning) can be utilized to classify each program and predict its probability or likelihood to be the cause of the problem. For example, a logistic regression model is a linear predictive classification model. The logistic regression model can calculate the coefficient of each feature in feature vector F based on historical training data, and then calculate the likelihood of each program artifact to be the root-cause. Program artifacts can be ranked by their likelihood and customers can be recommended to review the top-ranked artifacts. While only a few supervised classification models are mentioned herein, any supervised classification model can be used. Examples presented herein are intended to be illustrative and not intended to limit the scope of the techniques described.

Figure 6:
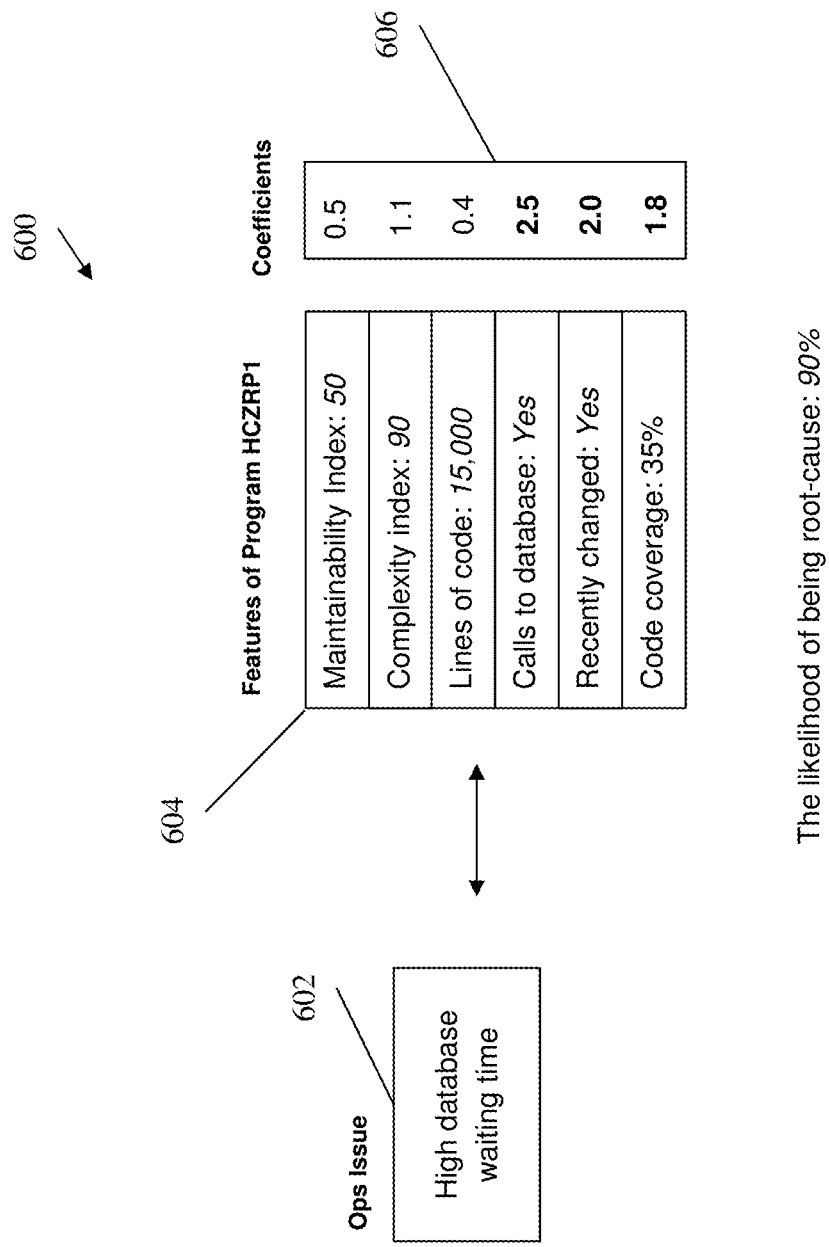
FIG. 6 depicts a block diagram of an example of supervised learning based root-cause analysis according to one or more embodiments of the invention.

FIG. 6 depicts a block diagram of an example of supervised learning based root-cause analysis according to one or more embodiments of the invention. The diagram 600 includes an identified operations issue 602 which in the illustrative example is a high database waiting time. A set of features 604 are defined for a program HCZRP1 with calculated weights 606 or coefficients for each feature in the set of features 604. In one or more embodiments of the invention, suppose a high database wait time issue has been detected, and a trained logistic regression model calculates the likelihood of all program artifacts based on learned coefficients of features (from historical training data). The features "Calls to database", "Recently changed", "Code coverage" have the largest coefficients 2.5, 2.0, and 1.8 respectively, which mean they are risk factors to the Ops issue. Then logistic regression calculates the linear combination of coefficients and feature values and outputs the likelihood of HCZRP1 being the root-cause to be 90%.

In one or more embodiments of the invention, unsupervised learning methods could also be utilized. If the labeled training data, i.e., the historical (P, F) records are not available. Unsupervised clustering or outlier detection and multi-columns numeric sorting to can be performed to rank the program artifacts by the root cause analysis engine 406. The top-ranked artifacts are likely to be the root-cause of Ops issues. For each identified (p, f) pair, i.e., the root cause of an Ops issue, specific actionable recommendations are generated based on rules in a domain knowledge base. For example, if the root-cause of an Ops issue is low code coverage of a program, an actionable recommendation can be to suggest customers to write more test cases to improve code coverage In one or more embodiments of the invention, an actionable recommendation can be performed automatically based on the root-cause. For example, if a code section which has poor query language and the root-cause returns the calls to the database as a likely root-cause of the operational issue, the poor query language can be commented out of the code and flagged for a developer to address during operational down time. The actionable recommendation can be performed automatically based on an analysis that the action does not affect operation of the system applications. Other example actionable recommendation can include inserting commented code into the code to address the portion of the code that is likely the root-cause.

Figure 7:
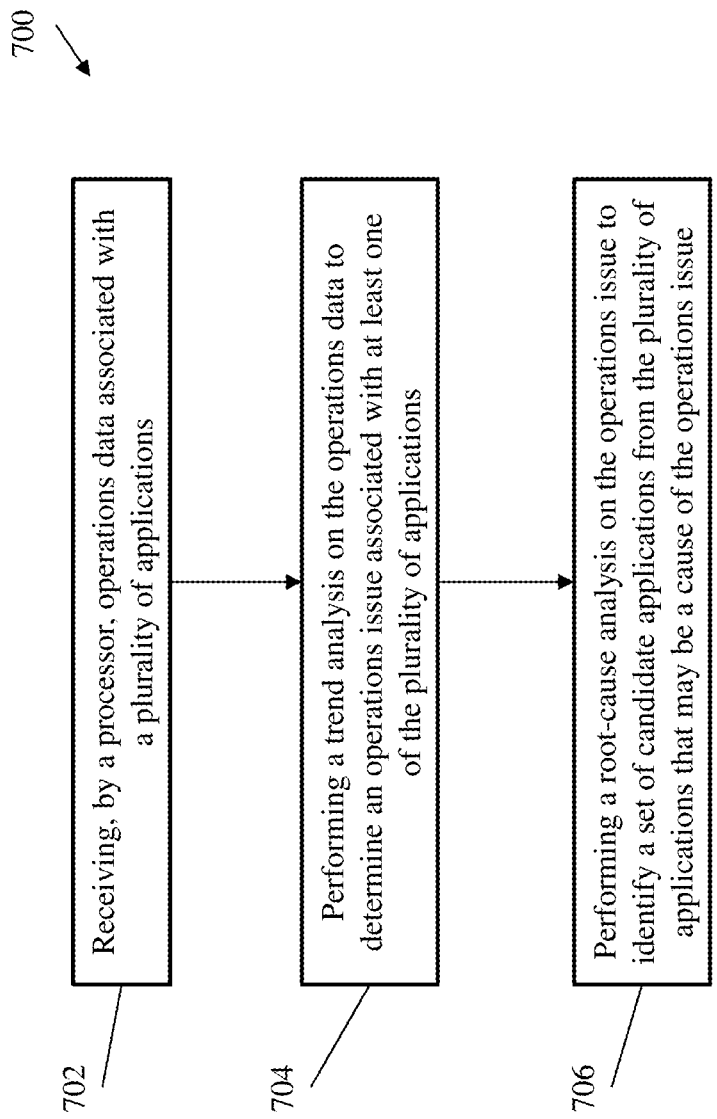
FIG. 7 depicts a flow diagram of a method for root cause analysis according to one or more embodiments of the invention.

FIG. 7 depicts a flow diagram of a method for root cause analysis according to one or more embodiments of the invention. The method 700 includes receiving, by a processor, operations data associated with a plurality of applications, as shown in block 702. At block 704, the method 700 includes performing a trend analysis on the operations data to determine an operations issue associated with at least one of the plurality of applications. The method 700, at block 706, includes performing a root-cause analysis on the operations issue to identify a set of candidate applications from the plurality of applications that may be a cause of the operations issue.

Additional processes may also be included. It should be understood that the processes depicted in FIG. 7 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for root cause analysis, the method comprising:
   receiving, by a processor, operations data associated with a plurality of applications;
   performing a trend analysis on the operations data to determine an operations issue associated with at least one of the plurality of applications; and
   performing a root-cause analysis on the operations issue to identify a set of candidate applications from the plurality of applications that may be a cause of the operations issue by:
      displaying, on a user dashboard, call graph data associated with the operations data for each candidate application, wherein the call graph data includes one or more weighted features of each candidate application;
      selecting, by a user, a root cause feature from the one or more weighted features from a root cause application based at least in part on the call graph data displayed on the user dashboard.

2. The computer-implemented method of claim 1, wherein performing the trend analysis on the operations data comprises:
   applying a peak detection algorithm to the operations data to determine one or more peaks in a trend; and
   identifying the operations issue based at least in part on the one or more peaks in the trend.

3. The computer-implemented method of claim 1, wherein performing the trend analysis on the operations data comprises:
   applying a peak prediction algorithm to the operations data to predict one or more future peaks in a trend; and
   identifying the operations issue based at least in part on the one or more future peaks in the trend, wherein the trend is a performance characteristic of at least one of the plurality of applications and is part of the operations data.

4. The computer-implemented method of claim 1, further comprising:
   accessing a rules knowledge base; and
   determining an actionable recommendation for the root cause feature based at least in part on the root-cause analysis and a rules knowledge base.

5. The computer-implemented method of claim 1, wherein performing the root cause analysis on the operations issue comprises:
   providing root-cause training data as an input to a machine learning model;
   applying the machine learning model to the operations issue associated with the plurality of applications to determine the set of candidate applications that may be the cause of the operations issue; and
   determining, based at least in part on the machine learning model, a set of features that are likely to be a root cause of the operations issue for each of the candidate applications.

6. The computer-implemented method of claim 5, further comprising
   analyzing the set of features for each candidate application in the set of candidate applications to determine a candidate score for each candidate application and a feature score for each feature in the set of features for each candidate application;
   determining a root cause application based at least in part on the candidate score for each candidate application; and
   determining a root cause feature for the root cause application based at least in part on the feature score for the root cause feature.

7. The computer-implemented method of claim 1, wherein the operation issue is selected from a set of predefined operation issues.

8. The computer-implemented method of claim 5, wherein the set of features comprise at least one of a maintainability index, a complexity index, lines of code, calls to a database, recent changes, and code coverage.

9. The computer-implemented method of claim 5, wherein the root cause training data comprises historical root cause data.

10. A system for root cause analysis comprising:
    a processor communicatively coupled to a memory, the processor configured to:
    receive operations data associated with a plurality of applications;
    perform a trend analysis on the operations data to determine an operations issue associated with at least one of the plurality of applications; and
    perform a root-cause analysis on the operations issue to identify a set of candidate applications from the plurality of applications that may be a cause of the operations issue by:
       displaying, on a user dashboard, call graph data associated with the operations data for each candidate application, wherein the call graph data includes one or more weighted features of each candidate application;
       selecting, by a user, a root cause feature from the one or more weighted features from a root cause application based at least in part on the call graph data displayed on the user dashboard.

11. The system of claim 10, wherein performing the trend analysis on the operations data comprises:
    applying a peak detection algorithm to the operations data to determine one or more peaks in a trend; and
    identifying the operations issue based at least in part on the one or more peaks in the trend.

12. The system of claim 10, wherein performing the trend analysis on the operations data comprises:
    applying a peak prediction algorithm to the operations data to predict one or more future peaks in a trend; and
    identifying the operations issue based at least in part on the one or more future peaks in the trend, wherein the trend is a performance characteristic of at least one of the plurality of applications and is part of the operations data.

13. The system of claim 10, further comprising:
    accessing a rules knowledge base; and wherein the processor is further configured to determine an actionable recommendation for the root cause feature based at least in part on the root-cause analysis and a rules knowledge base.

14. A computer program product for root cause analysis, the computer program product comprising a computer readable storage medium having program instructions embodied therewith, wherein the computer readable storage medium is not a transitory signal per se, the program instructions executable by a processor to cause the processor to perform a method comprising:

receiving, by a processor, operations data associated with a plurality of applications;

performing a trend analysis on the operations data to determine an operations issue associated with at least one of the plurality of applications; and performing a root-cause analysis on the operations issue to identify a set of candidate applications from the plurality of applications that may be a cause of the operations issue by:

displaying, on a user dashboard, call graph data associated with the operations data for each candidate application, wherein the call graph data includes one or more weighted features of each candidate application;

selecting, by a user, a root cause feature from the one or more weighted features from a root cause application based at least in part on the call graph data displayed on the user dashboard.

15. The computer program product of claim 14, wherein performing the root cause analysis on the operations issue further comprises:

providing root-cause training data as an input to a machine learning model;

applying the machine learning model to the operations issue associated with the plurality of applications to determine the set of candidate applications that may be the cause of the operations issue; and determining, based at least in part on the machine learning model, a set of features that are likely to be a root cause of the operations issue for each of the candidate applications.

16. The computer program product of claim 15, further comprising analyzing the set of features for each candidate application in the set of candidate applications to determine a candidate score for each candidate application and a feature score for each feature in the set of features for each candidate application;

determining a root cause application based at least in part on the candidate score for each candidate application; and determining a root cause feature for the root cause application based at least in part on the feature score for the root cause feature.

17. The computer program product of claim 14, wherein the operation issue is selected from a set of pre-defined operation issues.

18. The computer program product of claim 15, wherein the set of features comprise at least one of a maintainability index, a complexity index, lines of code, calls to a database, recent changes, and code coverage.

* * * * *